United States Patent [19]

Berecz

[11] Patent Number: 4,540,321

[45] Date of Patent: Sep. 10, 1985

[54] ANTI-VIBRATION THREAD FORM

[75] Inventor: Imre Berecz, Dana Point, Calif.

[73] Assignee: Microdot Inc., Darien, Conn.

[21] Appl. No.: 188,503

[22] Filed: Sep. 18, 1980

Related U.S. Application Data

[63] Continuation of Ser. No. 961,394, Nov. 16, 1978, abandoned.

[51] Int. Cl.³ .................................... F16B 39/30
[52] U.S. Cl. .................................... 411/310
[58] Field of Search ............... 411/285, 307, 308, 309, 411/310, 311

[56] References Cited

U.S. PATENT DOCUMENTS

| | | | |
|---|---|---|---|
| 1,075,310 | 10/1913 | Ulrich | 411/309 |
| 1,697,118 | 1/1929 | Hoke | 411/277 |
| 1,828,856 | 10/1931 | Bridges | 411/308 |
| 1,876,796 | 9/1932 | Trbojevich | 411/423 |
| 1,953,095 | 4/1934 | Baker | 411/411 |
| 2,005,348 | 6/1935 | Michell | 411/366 |
| 2,177,003 | 10/1939 | Pursell | 411/301 |
| 2,512,082 | 6/1950 | Bainbridge et al. | 411/416 |
| 2,514,589 | 7/1950 | Penman | 411/423 |
| 3,323,402 | 6/1967 | Gowen et al. | 411/411 |
| 3,433,117 | 3/1969 | Gowen et al. | 411/411 |
| 3,523,565 | 8/1970 | Olsen | 411/309 |
| 3,794,092 | 2/1974 | Carlson et al. | 411/310 |
| 4,071,067 | 1/1978 | Goldby | 411/307 |
| 4,076,064 | 2/1978 | Holmes | 411/285 |

FOREIGN PATENT DOCUMENTS

| | | | |
|---|---|---|---|
| 2550750 | 5/1976 | Fed. Rep. of Germany | 411/310 |
| Ad.40199 | 1/1932 | France | 151/14 R |
| 194042 | 1/1965 | Sweden . | |
| 335598 | 9/1930 | United Kingdom | 151/14 R |

Primary Examiner—Thomas J. Holko
Attorney, Agent, or Firm—Lyman R. Lyon

[57] ABSTRACT

An internal V-thread form has a concave following flank for engagement with the crest of an external thread.

1 Claim, 7 Drawing Figures

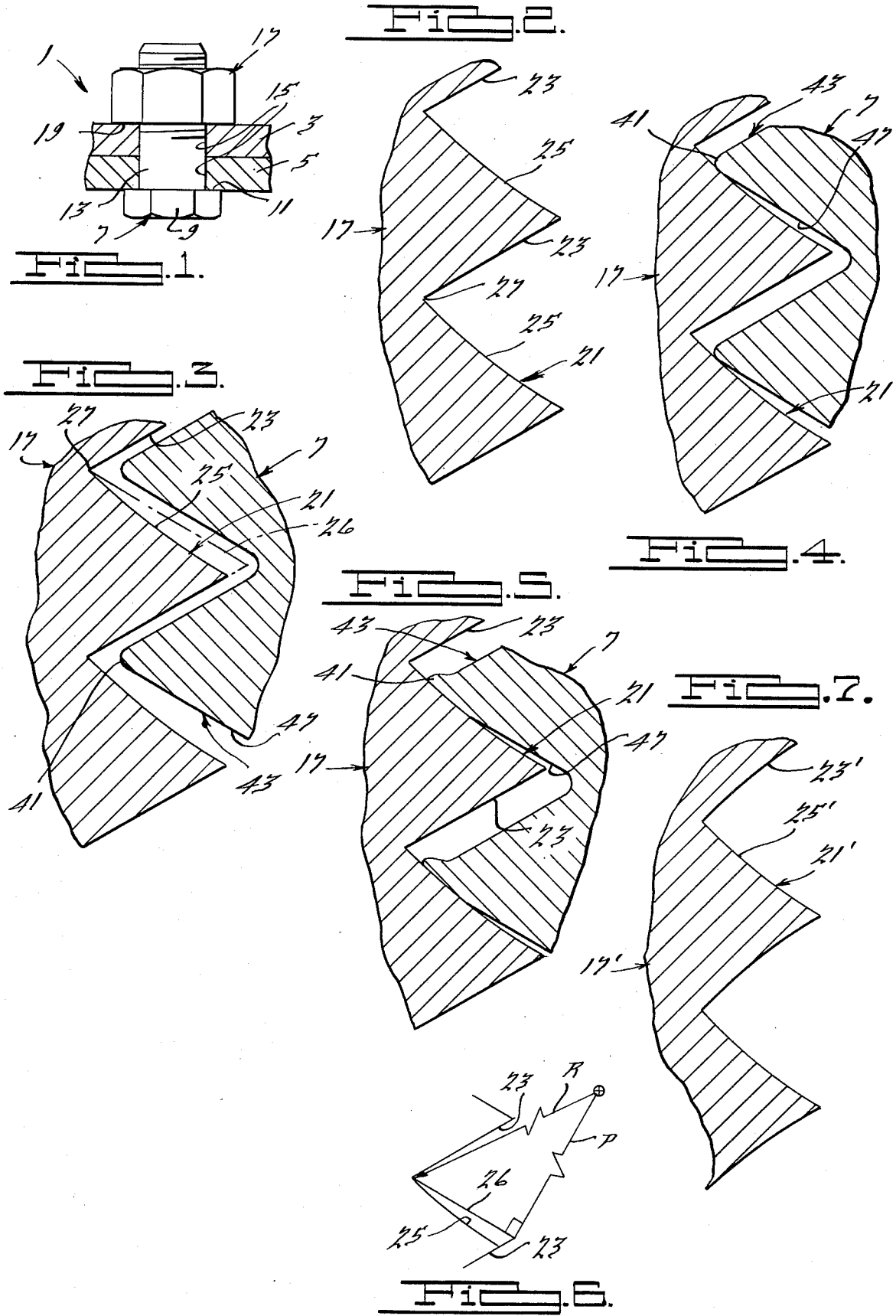

ANTI-VIBRATION THREAD FORM

This is a continuation of application Ser. No. 961,394, filed Nov. 16, 1978, now abandoned.

BRIEF SUMMARY OF THE INVENTION

It is the purpose of this invention to provide a vibration resistant thread form that may be consistently manufactured to proper size and shape.

The invention accomplishes this purpose by means of a relatively small structural change in a standard internal V-shape symmetrical thread form. In one form this change comprises an increase in the flank angle of the following flank so that the threads are asymmetric, the modified following flank having a larger flank angle than the leading flank. Preferably, the modified flank is given a concave curvature; and this, preferably, is selected so that the tangents to any point thereof that will be engaged under load by the bolt threads define "flank" angles greater than that of the leading flank or a standard following flank. In another form both leading and following flanks are modified in the same way so that the nut is bidirectional, i.e., may be used with either end on top. It is also feasible to modify the standard V-shape symmetrical bolt thread form for use with this internal thread form by changing at least the following side of the thread crest to a convex shape having the same curvature as the modified internal thread flank.

BRIEF DESCRIPTION OF THE DRAWINGS

FIG. 1 is a side elevation, partly in section, of a threaded fastener assembly embodying the thread form of this invention;

FIG. 2 is an enlarged cross section, broken away, of an asymmetric internal thread configuration embodying the invention for use in the nut of FIG. 1;

FIG. 3 is a section similar to FIG. 2 but showing the external thread in a no load condition with the internal thread and showing the standard following flank in phantom lines;

FIG. 4 is a cross section similar to FIG. 3 at the beginning of load on the threads;

FIG. 5 is a section similar to FIG. 4 but showing a substantial load on the threads;

FIG. 6 is a schematic view of the internal thread;

FIG. 7 is an enlarged cross section similar to FIG. 2 but showing a symmetrical internal thread embodying the invention.

DETAILED DESCRIPTION OF THE INVENTION

The invention is illustrated in connection with a threaded fastener assembly 1 for clamping parts 3 and 5 together. The assembly comprises a bolt 7 having a head 9 with a bearing surface 11 and a threaded shank 13 extending through aligned holes 15 in the parts 3 and 5 to thread into a nut 17 having a bearing surface 19. When sufficient torque is applied to the wrenching surfaces of the bolt and nut, the resulting tensile load in the shank 113 is balanced by compression of the bearing surfaces 11 and 19 against the parts 3 and 5 to clamp them together. It is the purpose of this invention to provide a thread form that will resist inadvertent unclamping of the parts.

If standard symmetrical V-shaped threads are used in the threaded assembly 1, it is likely that the parts 3 and 5 will come loose if subject to vibration or alternate transverse loading. This is thought to occur because dimensional variations in thread manufacturing produce clearances in use that allow relative lateral motion of the bolt and nut to occur in the threads. This eventually allows variable loads on the fasteners to work them loose. It is believed that looseness may also be the result of internal thread bending in combination with variable loads. The thread form of this invention combats the tendency to loosen by increasing the frictional resistance to loosening and also by modifying the flank geometry so that the crest of the bolt threads is, in effect, disposed inside of an inwardly tapered hole. Angular tightening motion of the bolt therefore powerfully aligns and centers the external threads in the internal threads to develop very tight thread contact along the length of the helical crest and minimize or eliminate clearances that permit relative lateral thread motion which could develop into looseness. Load transfer between engaged internal and external threads takes place at maximum diameters thereby minimizing bending of the internal threads and the tendency for that to contribute to looseness under alternating loads.

The nut 17 has a helical internal thread configuration 21 which is basically a modified standard V-shaped symmetrical thread with a 60° thread angle and a 30° flank angle. In the embodiment of FIGS. 2-6, the standard (or "nominal") thread form is modified so that the following flank has a flank angle more than 30° and the thread is asymmetric. The thread 21 has a straight leading flank 23 on the 30° angle and a following flank 25 which is preferably of concave curvature as shown in the drawings and on a larger flank angle than its nominal straight 30° flank 26. The flank 25 commences at the root diameter 27 of the thread form and its curvature is selected, preferably, so that tangents to all points on it that may be contacted by the bolt thread make flank angles greater than 30°. A preferred way to shape the curved surface of flank 25 is to form it on a relatively large radius R (FIG. 6) extending from the root diameter with a center lying on a perpendicular P to a standard following flank at its minimum diameter. Preferably, the radius is at least two times the length of the flank for a 30° flank angle thread in order to maintain substantial flank length.

The phantom lines in FIG. 3 illustrate the symmetrical nominal following flank 26 that would be obtained if the thread 21 were not modified in accordance with the invention. It will be seen that it has a smaller flank angle than any tangents to the curved flank 25. It will also be seen that the larger angle of flank 25 causes it to intersect the adjacent leading flank 23 at a larger diameter than in the case of a symmetrical thread form, thereby shortening the thread.

Referring to FIGS. 3-5, the no load condition when the nut and bolt are loosely connected together is shown in FIG. 3. When torque is applied, the crest 41 of the standard, symmetrical, 30° flank, external V-threads 43 of bolt 7 will engage the following flank 25 of the nut threads as illustrated in FIG. 4. With the application of more torque to the assembly 1, clearances are taken up and some bolt thread deformation may occur as the crest 41 moves downwardly along the flank 25 as shown in FIG. 5. The flank 25 is inwardly tapered with respect to the crest 45 so that this movement tends to align and center the bolt threads on the thread axis and provide contact under load along the helical length of the crest 41 to resist relative lateral movement of the bolt and nut threads. Since the angle of contact is less than the original 30°, friction is greater as is resistance to lateral shifting. Tangents to surface 25 make angles greater than the 30° angle of its nominal straight flank 26 (FIG. 3) so that the surface 25 is out of contact with the following flank 47 of the bolt threads 43 to maintain engagement at maximum thread diameters where the hoop strenght of the nut body can take the load. Thus, thread strength and vibration resistance are improved as compared with the standard V-shaped symmetrical internal thread.

The internal threads 21 may be formed with thread cutting tools or taps that are substantially the same as conventional V-thread forming tools and may be tapped in blind holes and formed in large forgings, castings, etc. Thus, the nut body 17 shown herein is merely illustrative of a part having internal threads embodying the invention. The thread form 21 of this invention is substantially as simple to make as standard V-shaped threads thereby promoting economy and consistent quality in manufacturing. However, the change from the nominal straight flank 26 whereby the line of contact with the concave following flank is angularly moved in the direction of parallelism with the thread axis provides means to increase the thread holding power and improve resistance to loosening under oscillating or alternating loads on the parts or threads.

The threads 21 shown in FIGS. 2-6 are asymmetric in that the leading flank 23 is straight and the following flank 25 is concave in accordance with the invention. The thread 21 is therefore unidirectional since the bolt must be inserted from a particular end if the benefits of the invention are to be obtained; though it may be noted that if the direction of insertion is reversed (e.g. by turning nut 17 upside down), the threaded assembly merely reverts to a standard engagement with 30° flanks 23 and 47 engaging each other under load. It is a simple matter to make the threads bidirectional as illustrated in FIG. 8 by nut 17' with threads 21' having following flank 25' like flank 25 and a correspondingly curved leading flank 23'. Thus, if the threads 21' are inverted (i.e., the nut 17' used upside down) the leading flank 23' becomes the following flank; and, since the two are symmetrical, there is no difference in operation or function of the threads.

It will now be apparent that the invention provides a thread configuration that is simple and relatively easy to consistently produce and which improves the holding power and vibration resistance of the threads as compared with standard straight flank configurations. The thread configuration may be regarded as having an actual form (i.e., the threads 21 or 21') and a nominal form (i.e. the threads shown in phantom lines and the standard symmetrical V-shape threads) which the invention has modified into the actual form by curvature of the nominal following flanks 26 to produce the actual flanks 25, 25', and 23'. Variations in the specific details and structures shown may be made without departing from the spirit and scope of the invention.

I claim:

1. A vibration resistant fastener assembly comprising a nut body having an aperture provided with a helical internal thread, and a member having a substantially V-shaped symmetrical external helical thread with a standard leading and following flank angle of sixty degrees relative to the central axis of said member and adapted to mate with said helical internal thread, the internal thread in said nut body having a thread form comprising a leading flank and a following flank, said following flank having a concave surface such that all tangents thereto extend at an angle less than sixty degrees relative to the central axis thereof and less than the flank angle of the following flank of the external thread on said member whereby the radially outermost portion of said external thread is initially engageable with the concave flank of said internal thread.

* * * * *